(12) United States Patent  (10) Patent No.: US 8,000,759 B2
Huang  (45) Date of Patent: Aug. 16, 2011

(54) PORTABLE ELECTRONIC DEVICE

(75) Inventor: Shan-Fu Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 414 days.

(21) Appl. No.: 12/233,841

(22) Filed: Sep. 19, 2008

(65) Prior Publication Data

US 2009/0270133 A1 Oct. 29, 2009

(30) Foreign Application Priority Data

Apr. 28, 2008 (CN) .......................... 2008 1 0301347

(51) Int. Cl.
*H04M 1/00* (2006.01)

(52) U.S. Cl. ................ 455/575.8; 455/575.1; 455/575.4

(58) Field of Classification Search ................ 455/575.8
See application file for complete search history.

(56) References Cited

U.S. PATENT DOCUMENTS

| | | | | |
|---|---|---|---|---|
| 4,363,154 A | * | 12/1982 | Lee | ................................ 15/102 |
| 6,009,338 A | * | 12/1999 | Iwata et al. | ................ 455/575.4 |
| 6,167,936 B1 | * | 1/2001 | Stover et al. | .................... 160/27 |
| 2003/0015301 A1 | * | 1/2003 | Killo et al. | ..................... 160/310 |
| 2004/0169466 A1 | * | 9/2004 | Suehiro et al. | ................ 313/512 |

* cited by examiner

*Primary Examiner* — Patrick Edouard
*Assistant Examiner* — Justin Lee
(74) *Attorney, Agent, or Firm* — Altis Law Group, Inc.

(57) ABSTRACT

A portable electronic device includes a main body and a screen protection component. The main body includes a front surface, a display screen positioned on the front surface, a slide rail, a back surface opposite to the front surface, a top surface between the front surface and the back surface, and a bottom surface opposite to the top surface. The screen protection component includes a first rotating shaft and a protection layer configured to cover the front surface and having a fixed end adjacent to the top surface and a free end adjacent to the bottom surface. The first rotating shaft is positioned along the intersection of the front surface and the top surface. The fixed end of the protection layer is engaged with the first rotating shaft. One side of the protection layer is received in the slide rail.

7 Claims, 2 Drawing Sheets

PORTABLE ELECTRONIC DEVICE

CROSS-REFERENCE STATEMENT

The present application is based on, and claims priority from, CN Application Serial Number 200810301347.4, filed on Apr. 28, 2008, titled portable electronic device, the disclosure of which is hereby incorporated by reference herein in its entirety.

BACKGROUND

1. Technical Field

The disclosure generally relates to portable electronic devices and particularly, to a portable electronic device having a reliable screen protection component.

2. Description of Related Art

With the development of wireless communication and information processing technologies, portable electronic devices such as mobile phones, and personal digital assistants are in widespread use. The display screens of the portable electronic devices are typically made of glass or plastic materials. The display screens can become worn and damaged during normal usage. Thus, protective films may be used to protect the display screens. However, the protective films attached to the display screens may detach from the display screens and no longer provide protection.

Therefore, a new portable electronic device is desired in order to overcome the above-described shortcoming.

SUMMARY

An exemplary embodiment provides a portable electronic device including a main body and a screen protection component. The main body includes a front surface, a display screen positioned on the front surface, a back surface opposite to the front surface, a top surface between the front surface and the back surface, a bottom surface opposite to the top surface and a slide rail. The screen protection component includes a first rotating shaft, and a protection layer configured to cover the front surface and having a fixed end adjacent to the top surface and a free end adjacent to the bottom surface. The first rotating shaft is positioned along the intersection of the front surface and the top surface. The fixed end of the protection layer is engaged with the first rotating shaft. One side of the protection layer is received in the slide rail.

Other advantages and novel features will become more apparent from the following detailed description when taken in conjunction with the accompanying drawings.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the embodiment. Moreover, in the drawings, like reference numerals designate corresponding parts throughout the several views.

DETAILED DESCRIPTION OF THE EMBODIMENT

Figure 1:
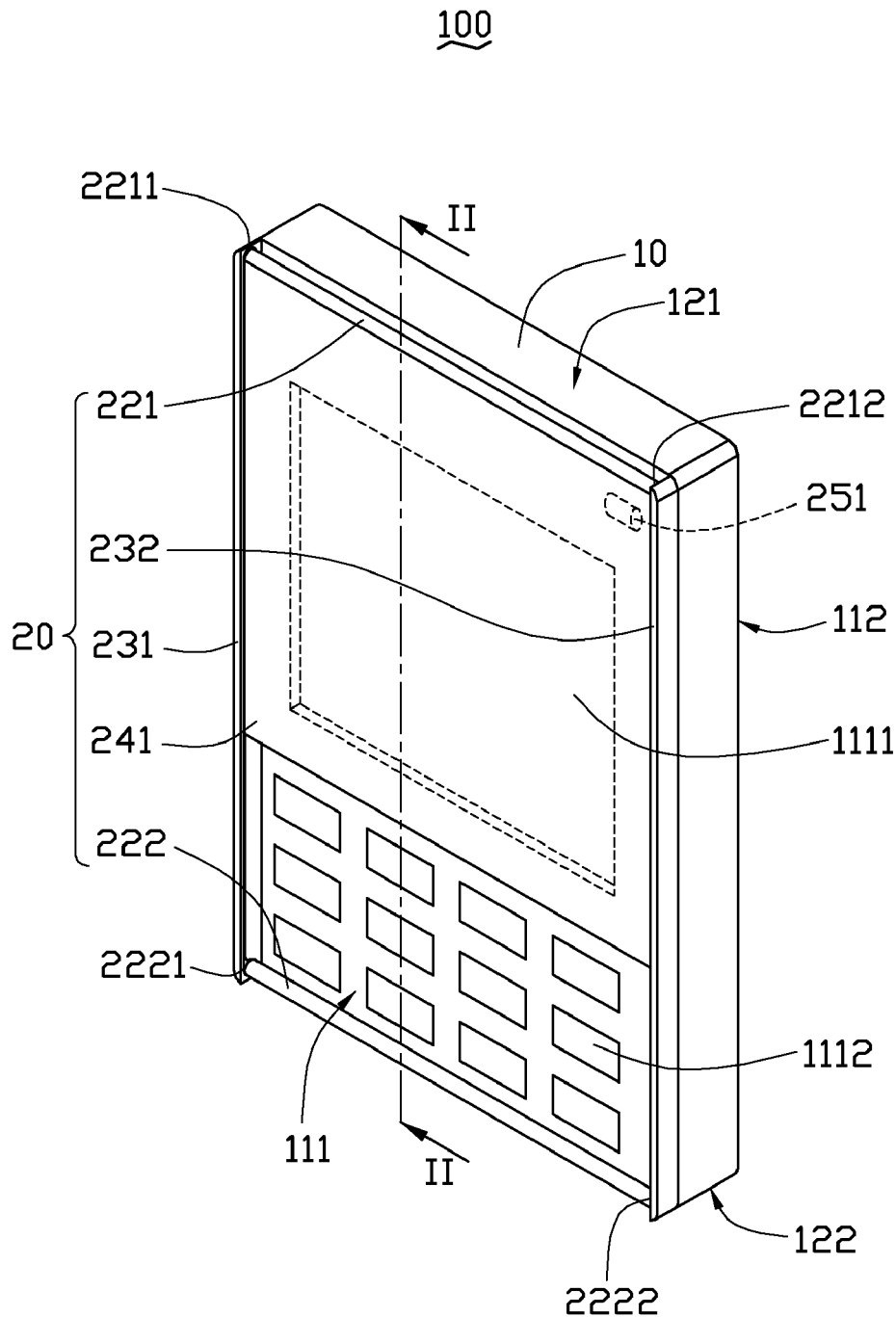
FIG. 1 is a perspective view of one embodiment of a portable electronic device.
Figure 2:
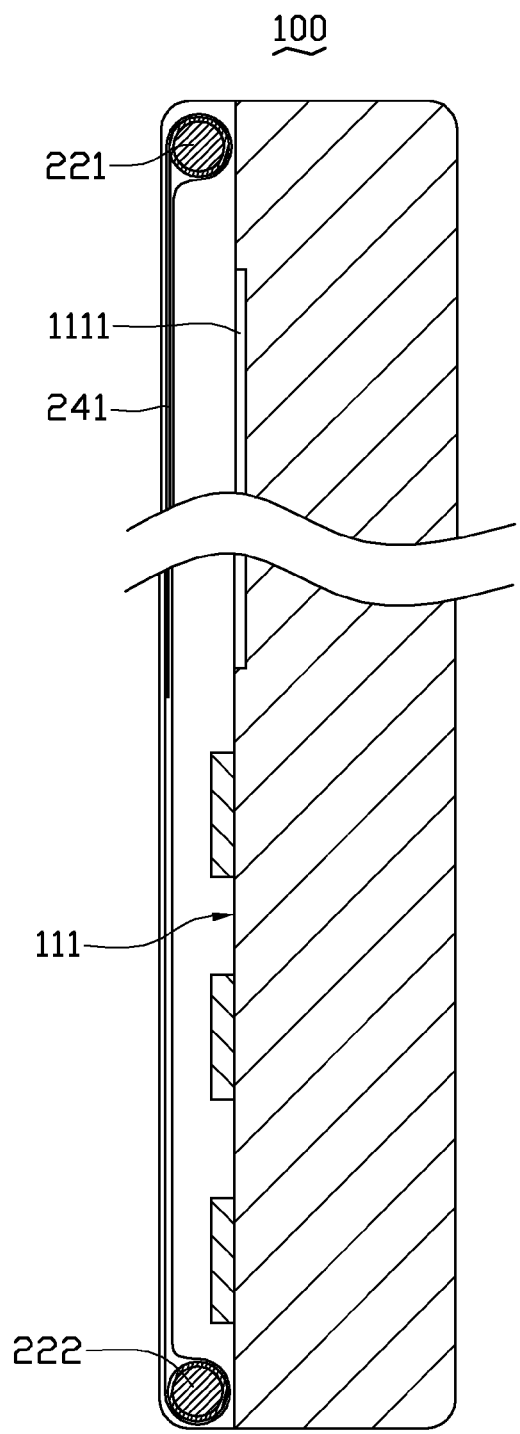
FIG. 2 is a partial, cross-sectional view of the portable electronic device of FIG. 1, as taken along line II-II.

Referring to FIGS. 1 and 2, one embodiment of a portable electronic device 100 includes a main body 10 and a screen protection component 20 secured to the main body 10.

The main body 10 has a front surface 111, a display screen 1111 and a keyboard 1112 positioned on the front surface, a back surface 112 opposite to the front surface 111, a top surface 121 between the front surface 111 and the back surface 112, and a bottom surface 122 opposite to the top surface 121.

The screen protection component 20 includes a first rotating shaft 221, a second rotating shaft 222, and a protection layer 241. The first rotating shaft 221 is positioned along the intersection of the front surface 111 and the top surface 121. The second rotating shaft 222 is positioned along the intersection of the front surface 111 and the bottom surface 122. The first and second rotating shafts 221, 222 are parallel to each other.

A first slide rail 231 is formed on the main body 10 and extends from the front surface 111. The first slide rail 231 is connected between a distal end 2211 of the first rotating shaft 221 and a distal end 2221 of the second rotating shaft 222. A second slide rail 232 is formed on the main body 10 and extends from the front surface 111. The second slide rail 232 is connected between a proximal end 2212 of the first rotating shaft 221 and a proximal end 2222 of the second rotating shaft 222. The first and second slide rails 231, 232 are parallel to each other. The first and second ratating shafts 221, 222 and the first and second slide rails 231, 232 cooperatively surround the display screen 1111 and the keyboard 1112 therein.

The protection layer 241 is configured to cover the front surface 111 includes the display screen 1111 and the keyboard 1112 therein. The protection layer 241 has a fixed end adjacent to the top surface 121 and a free end adjacent to the bottom surface 122. The fixed end of the protection layer 241 is rotatably engaged in the first rotating shaft 221. The free end of the protection layer 241 is rotatably configured to engage in the second rotating shaft 222. Two corresponding sides of the protection layer 241 are received in the first and second slide rails 231, 232. The protection layer 241 may be a film made of transparent materials, for example, transparent epoxy resin.

A motor 251 is positioned in the main body 10 and connected to the first rotating shaft 221 for driving the first rotating shafts 221 to rotate.

When the portable electronic device 100 is not in use, the motor 251 drives the first rotating shaft 221 to roll out the protection layer 241. The protection layer 241 slides along the first and second slide rails 231, 232 to cover the front surface 111. The free end of the protection layer 241 is rolled in the second rotating shaft 222.

When the portable electronic device 100 is in use, the protection layer 241 is rolled into the first shaft 221 guided by the first and second slide rails 231, 232 to expose the front surface 111.

It is believed that the present embodiments and their advantages will be understood from the foregoing description, and it will be apparent that various changes may be made thereto without departing from the spirit and scope of the invention or sacrificing all of its material advantages, the examples here before described merely being preferred or exemplary embodiments of the invention.

What is claimed is:

1. A portable electronic device comprising:
   a main body comprising a front surface, a display screen positioned on the front surface, a first slide rail and a second slide rail both located on and protruding from and extending from the front surface, a back surface opposite to the front surface, a top surface positioned between the front surface and the back surface, and a bottom surface opposite to the top surface; and a screen protection component comprising a first rotating shaft positioned along the intersection of the front surface and the top surface, and a windable protection layer configured to cover front surface and having a fixed end adjacent to the top surface and a free end adjacent to the bottom surface;

wherein the fixed end is engaged with the first rotating shaft for winding around the first rotating shaft; a first side of the windable protection layer is received in the first slide rail, a second side of the windable protection layer is received in the second slide rail, the screen protection component further comprises a second rotating shaft configured to engage with the free end; the second rotating shaft is positioned along the intersection of the front surface and the bottom surface; the first slide rail is connected between a distal end of the first rotating shaft and a distal end of the second rotating shaft; the second slide rail is connected between a proximal end of the first rotating shaft and a proximal end of the second rotating shaft.

2. The portable electronic device of claim 1, further comprising a motor positioned in the main body and connected to the first rotating shaft.

3. The portable electronic device of claim 1, wherein the protection layer is a transparent film.

4. The portable electronic device of claim 3, wherein the transparent film is a transparent epoxy resin.

5. The portable electronic device of claim 1, wherein the front surface further comprises a keyboard, the first and second rotating shafts and the first and second slide rails cooperatively surround both the display screen and the keyboard therein, and the protection layer is configured to cover both the display screen and the keyboard.

6. A portable electronic device comprising:

a main body comprising a front surface, a display screen positioned on the front surface, a first slide rail and a second slide rail both extending from the front surface, the second slide rail parallel to the first slide rail, a back surface opposite to the front surface, a top surface positioned between the front surface and the back surface, and a bottom surface opposite to the top surface; and a screen protection component comprising a first rotating shaft positioned along the intersection of the front surface and the top surface, a second rotating shaft positioned along the intersection of the front surface and the bottom surface, and a protection layer configured to cover the front surface and having a fixed end adjacent to the top surface and a free end adjacent to the bottom surface;

wherein the fixed end is engaged with the first rotating shaft; a first side of the protection layer is received in the first slide rail; a second side of the protection layer is received in the second slide rail; the second rotating shaft is configured to engage with the free end; the first slide rail is connected between a distal end of the first rotating shaft and a distal end of the second rotating shaft; the second slide rail is connected between a proximal end of the first rotating shaft and a proximal end of the second rotating shaft.

7. A portable electronic device comprising:

a main body comprising a front surface, a display screen positioned on the front surface, a first slide rail and a second slide rail both located on and protruding from and extending from the front surface, the second slide rail parallel to the first slide rail, a back surface opposite to the front surface, a top surface positioned between the front surface and the back surface, and a bottom surface opposite to the top surface; and a screen protection component comprising a first rotating shaft positioned along the intersection of the front surface and the top surface, a second rotating shaft positioned along the intersection of the front surface and the bottom surface, and a windable protection layer configured to cover the front surface and having a fixed end adjacent to the top surface and a free end adjacent to the bottom surface;

wherein the fixed end is rotatably engaged with the first rotating shaft; the free end is rotatably engaged with the second rotating shaft; a first side of the windable protection layer is received in the first slide rail, a second side of the windable protection layer is received in the second slide rail; the first slide rail is connected between a distal end of the first rotating shaft and a distal end of the second rotating shaft; the second slide rail is connected between a proximal end of the first rotating shaft and a proximal end of the second rotating shaft.

* * * * *